2,994,707
NEOERGOSTEROL DERIVATIVES

Joseph Elks, London, John Francis Oughton, Gerrards Cross, and Leslie Stephenson, London, England, assignors to Glaxo Laboratories Limited, Greenford, England, a British company
No Drawing. Filed Aug. 4, 1959, Ser. No. 831,479
Claims priority, application Great Britain Aug. 7, 1958
19 Claims. (Cl. 260—397.4)

This invention is concerned with improvements in or relating to the preparation of steroids and in particular with the preparation of novel derivatives of neoergosterol.

It is an object of the present invention to provide new compounds of the general formula:

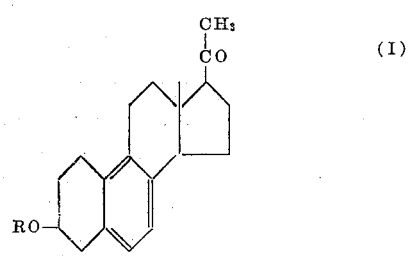

(where R is hydrogen or an acyl radical) which can be prepared from compounds of general formula:

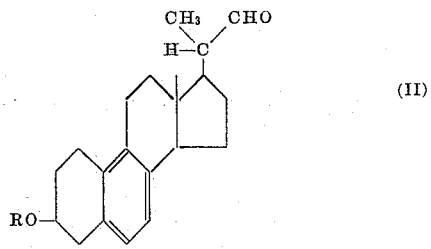

wherein R has the meanings defined above.

Compounds of general Formula I are novel intermediates for use in research in the steroid field and for use in the synthesis of various compounds of physiological interest. For example, these compounds can be converted into physiologically-active steroids, e.g. into compounds of the equilenin series, by aromatisation of ring A, e.g. by dehydrogenation of ring A in the presence of palladium or platinum and degradation of the $C_{17}$-side chain (e.g. by enol acetylation followed by ozonolysis) or vice-versa.

According to the invention, therefore, we provide as new compounds, compounds of the general formula:

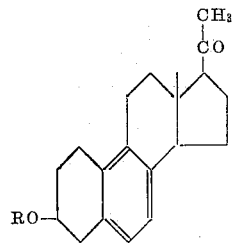

in which R is a hydrogen atom or an acyl radical, particularly an acyl radical derived from a lower aliphatic carboxylic acid containing 1–6 carbon atoms, e.g. acetic acid, propionic acid, butyric acid, etc., or from an arylcarboxylic acid, e.g. benzoic acid, etc.

These compounds of the general Formula I above may be prepared from compounds of general Formula II above by one of two methods. Both of these methods involve converting the aldehyde group into an enolic derivative and oxidising the resultant compound to form the desired 17-side chain.

The first of these methods, which is in fact the preferred method, comprises reaction of a compound of general Formula II with a secondary amine, which may be cyclic or acyclic, to form an enamine, followed by oxidation of the enamine. These reactions may be shown as follows:

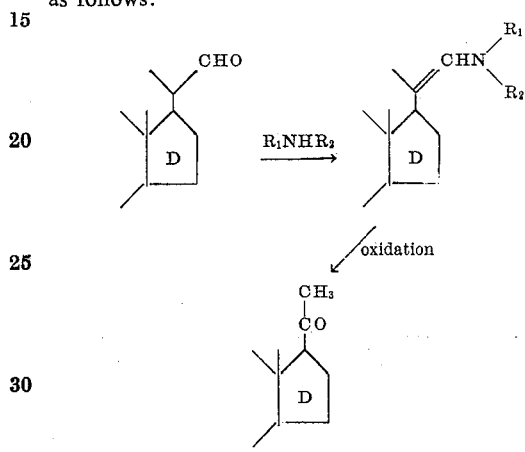

where $R_1$ is an aliphatic group, e.g. a lower alkyl group, or an aralkyl or aromatic group, and $R_2$ is an aliphatic group, e.g. a lower alkyl group, or an aralkyl group, or $R_1$ and $R_2$ together with the adjacent nitrogen atom form the residue of a heterocyclic ring (which may contain other heterocyclic elements) e.g. piperidino or morpholino.

The enamine is preferably formed in an organic solvent medium e.g. benzene, water being removed, e.g. by azeotropic distillation, as it is formed. The reaction will proceed without a catalyst but we found that it is advantageous to use a strong acid catalyst, e.g. toluene-p-sulphonic acid in order to reduce the reaction time. The resulting enamines are not very stable and should preferably not be crystallised before oxidation.

We have found that the oxidation of the enamine may be carried out in any of three ways:

(a) Ozonolysis in an organic solvent, e.g. ether, or chloroform/acetic acid, preferably at low temperatures, e.g. −30° C. to 0° C. followed by reduction of the resulting ozonide, for example by means of zinc and acid, e.g. acetic acid, or by catalytic hydrogenation. The ozonolysis requires to be carefully controlled as there is no definite end-point to the reaction and, if it is allowed to proceed too far, attack on the aromatic ring will occur. The optimum rate of ozone input and the total amount of ozone required can be determined by preliminary trials. The course of the reaction may be followed by observation of some convenient optical property of aliquots taken from the ozonolysis reaction mixture and reduced, e.g. with zinc and acetic acid; the characteristic keto band ($\nu$ max. 1710 cm.$^{-1}$) and characteristic aromatic band ($\nu$ max. 810 cm.$^{-1}$) are convenient optical properties for the purpose.

(b) Oxidation with an alkali metal dichromate in a liquid aliphatic carboxylic acid, e.g. acetic acid. By this method, a yield of 49% of 3β-acetoxy-19-norpregna-5:7:9(10)-trien-20-one was obtained from the corresponding enamine, although there was some evidence of attack on the aromatic ring.

(c) Oxidation with a chromium trioxide-tertiary amine complex. This is the preferred method of the three since in general it has given the best yields. Thus, yields of up to 75% of 3β-acetoxy-19-norpregna-5:7:9(10)-trien-20-one have been obtained from the corresponding enamine using a chromium trioxide-pyridine complex as oxidising agent. It is of interest to note that by this method one can oxidise the 3-hydroxy-enamine to the 3-hydroxy-20-ketone (Formula I, R=H). Simultaneous oxidation of the 3-hydroxy group does not in general occur, unlike the corresponding compounds without an aromatic ring B.

It is, therefore, a preferred feature of the invention that the conversion of the compounds of Formula II to compounds of Formula I takes place by first forming an enamine and then oxidising this enamine with a chromium trioxide-tertiary amine complex.

An alternative method for converting compounds of Formula II to compounds of Formula I comprises first forming an enol-acylate:

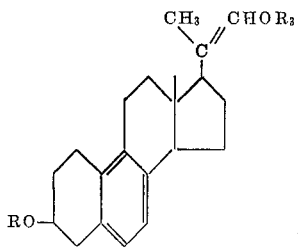

where R has the meanings defined above and $R_3$ is also an acyl radical, preferably a lower alkanoyl group, and then oxidising the enol-acylate to the compound containing the desired 17-side chain. The enol-acylation may be carried out for example by reaction of the aldehydo compound with acetic anhydride and an alkali metal acetate or by reaction with acetic anhydride in a suitable solvent, e.g. toluene, in the presence of a sulphonic acid e.g. sulphosalicylic acid, toluene sulphonic acid, methane sulphonic acid, etc. The subsequent oxidation may be carried out by ozonolysis whilst observing the precautions set out above under (a).

Compounds of Formula II above may be prepared by subjecting neoergosterol or a 3-acyl derivative thereof to oxidation, conveniently by ozonolysis under controlled conditions in a solvent medium, so that, after reduction of the intermediate ozonide, the desired aldehyde is formed in substantial proportion. Reduction of the intermediate ozonide is, for example, conveniently carried out by means of zinc and acid, e.g. acetic acid, or by catalytic hydrogenation.

The oxidation of the neoergosterol or its 3-acyl derivative requires to be carefully controlled if a reasonable yield of aldehyde is to be obtained. Thus, with ozonolysis there is no definite end-point in the reaction since attack on the aromatic ring and/or conversion to the corresponding 20-acid follows the desired break-down of the $C_{17}$-side chain. The optimum rate of ozone input and the total amount of ozone required can be determined by preliminary trial. The course of the ozonolysis reaction may be followed by observation of some convenient optical property of aliquots of the reaction mixture which have been reduced e.g. by zinc and acetic acid, e.g. the characteristic aldehyde band (ca. 2700 cm.$^{-1}$) and characteristic aromatic band (810 cm.$^{-1}$). A useful criterion for the completeness of the reaction is the disappearance of the band at ca. 970–980 cm.$^{-1}$ characteristic of the 22—23 double bond in neoergosterol and its esters.

The starting neoergosteryl compound should be reasonably soluble in the solvent medium used. Thus, whilst acetic acid alone led to over-oxidation of neoergosteryl acetate with ozone, a mixture of acetic acid with halogenated hydrocarbon, e.g. carbon tetrachloride, or chloroform, gave satisfactory results.

In order that the invention may be well understood, the following examples are given by way of illustration only. All temperatures are measured in degrees centigrade.

EXAMPLE 1

*3β-acetoxy-19-norpregna-5:7:9(10)-triene-20α-aldehyde*

Neoergosteryl acetate (12 g.) in chloroform (120 ml.) and acetic acid (120 ml.) was ozonised using 46 l./hr. ozonised oxygen (0.0406 g. $O_3$/l.; 0.98 mol) for 43 minutes at 0°. Zinc dust was then added to the reaction product until starch-iodide paper indicated the absence of ozonide. The zinc was filtered off through kieselguhr and the filtrate washed three times with water, and then twice with aqueous 2 N-sodium carbonate solution. Further washing with water, drying and evaporation yielded the crude aldehyde. This material was satisfactory for use in the preparation of the enol acetate or enamine. Purification through the sodium bisulphite complex and crystallisation from ethanol gave the pure material with M.P. 128–130°, $[\alpha]_D$ —11.9° (c. 0.6 in $CHCl_3$). (Found: C, 77.75; H, 8.6. $C_{23}H_{30}O_3$ requires C, 78.0; H, 8.5%.)

EXAMPLE 2

*3β-hydroxy-19-norpregna-5:7:9(10)-triene-20α-aldehyde*

Neoergosterol (12 g.) in chloroform (120 ml.) and acetic acid (120 ml.) was ozonised using 48 l./hr. ozonised oxygen (0.0403 g. $O_3$/l.; 0.96 mol) for 45 minutes at 0°. The ozonide was decomposed and the product further treated as in Example 1 to give the crude aldehyde (8.13 g.).

EXAMPLE 3

*3β-acetoxy-20-acetoxymethylene-19-norpregna-5:7:9(10)-triene*

The aldehyde prepared as in Example 1 (0.96 g.) was refluxed in acetic anhydride (2 ml.) containing anhydrous potassium acetate (20 mg.) for 8 hours. The solvent was removed in vacuo and the straw-coloured oil taken up in methanol and allowed to crystallise. Filtration gave 0.7 g. of pale yellow crystals, M.P. 90–95°.

Recrystallisation gave the enole acetate as prisms, M.P. 99–101°, $[\alpha]_D$ —27° (c., 1.37 in $CHCl_3$). (Found: C, 76.35; H, 7.95%. $C_{22}H_{32}O_4$ requires C, 75.7; H, 8.1%.)

EXAMPLE 4

3β-acetoxy-19-norpregna-5:7:9(10)-triene-20α-aldehyde (2 g.) was dissolved in toluene (54 ml.) containing acetic anhydride (5.2 ml.) and sulphosalicylic acid dihydrate (80 mg.) and the mixture was refluxed for 12 hours. During the last 6 hours 18 ml. of distillate was removed. The mixture was cooled to room temperature and poured on to ice, shaken occasionally for 30 mins. and extracted with ether. The ether extract was washed with water, ice cold 5% sodium hydroxide solution and again with water, dried over sodium sulphate, filtered and evaporated to dryness giving the crude enol acetate as a gum, $[\alpha]_D$ —30.7° (c., 0.48 in $CHCl_3$).

EXAMPLE 5

*3β-acetoxy-19-norpregna-5:7:9(10)-trien-20-one*

Crude 3β-acetoxy-20 - acetoxymethylene-19-norpregna-5:7:9(10)-triene, prepared from 2 g. of aldehyde as described in Example 4, was dissolved in chloroform/acetic acid solution (50:50 v./v., 60 ml.), and ozonised with 10 litres/hr. ozonised oxygen (0.0375 g. $O_3$/l. 0.65 mol) at 0° with vigorous stirring for 28 mins. approx. The solution was left for 5 min. at 0° C. and then zinc powder (acid washed) was added and the suspension left stirring for 30 min. The solution was tested with starch/potassium iodide paper acidified with dilute hydrochloric acid and gave no colour. The suspension was filtered, washed with chloroform and the filtrate was poured into water. The mixture was extracted with methylene chloride. The methylene chloride extract was washed with water, sodium hydrogen carbonate solution and again with water, filtered and evaporated to dryness giving a gum (1.96 g.) $[\alpha]_D^{21}$ +12° (c., 0.58 in $CHCl_3$). This product was refluxed with Girard P reagent (2 g.) in ethanol (20 ml.) containing 10% v./v. glacial acetic acid for 1 hr., cooled to room temperature and poured into sodium hydrogen carbonate solution. The aqueous solution was extracted with ether and acidified to pH 1 with concentrated hydrochloric acid. After 15 mins. the mixture was extracted with ether. The ether solution was washed with water, sodium hydrogen carbonate solution, and again with water, dried over magnesium sulphate, filtered and evaporated to dryness. Crystallisation of the residue from aqueous alcohol gave the 20-ketone (320 mg.), M.P. 109–112°, $[\alpha]_D$ +46° (c., 0.46 in $CHCl_3$). A second crop (28 mg.) had M.P. 110–116°. The first crop was recrystallised from alcohol to give 235 mg., M.P. 114–116°, $[\alpha]_D$ +51.5° (c., 0.36 in $CHCl_3$).

EXAMPLE 6

*3β-acetoxy-20-piperidinomethylene-19-norpregna-5:7:9(10)-triene*

3β-acetoxy-19-norpregna - 5:7:9(10) - triene-20α-aldehyde (13.3 g.), piperidine (5.3 ml.), and tolune-p-sulphonic acid (0.4 g.) in benzene (200 ml.) were heated under reflux in an atmosphere of nitrogen for 1 hour. A Dean and Stark apparatus was incorporated to remove water formed in the reaction.

The volume of solvent was then reduced in vacuo and methanol added. Evaporation was continued until crystals of enamine were deposited. The mixture was cooled and the solid material (10.11 g.) filtered off, washed with methanol and dried.

Recrystallisation of a sample from acetone afforded 3β-actoxy-20-piperidinomethylene - 19-norgprena-5:7:9(10)-triene, M.P. 129–132°, $[\alpha]_D$ —42° (c., 1.0 in $CHCl_3$). (Found: C, 79.9; H, 9.3; N, 3.1. $C_{28}H_{39}O_2N$ requires C, 79.8; H, 9.3; N, 3.3%.)

EXAMPLE 7

*3β-hydroxy-20-piperidinomethylene-19-norpregna-5:7:9(10)-triene*

3β-hydroxy-19-norpregna - 5:7:9(10)-triene-20α-aldehyde prepared as in Example 2 (8.1 g.) was treated with piperidine and toluene-p-sulphonic acid in benzene as in Example 6. The product (4.19 g.) had M.P. 122°, $[\alpha]_D$ —49.5° (c., 1.1 in $CHCl_3$).

EXAMPLE 8

*3β-acetoxy-19-norpregna-5:7:9(10)-trien-20-one*

3β-acetoxy-20-piperidinomethylene-19-norpregna-5:7:9-(10)-triene (3 g.) in dry ether (60 ml.) was treated with ozonised oxygen (41 l./hr., 0.0408 g. $O_3$/l., 1.47 mols) at —35° for 18 minutes. The temperature of the solution was then increased to 0° and acetic acid (20 ml.) was added. Zinc dust was added gradually until starch-iodide paper indicated the absence of ozonide. The zinc dust was filtered off through kieselguhr and the filtrate was washed three times with water and then twice with 2 N aqueous sodium carbonate solution. Further washing with water, drying and evaporation afforded 2.23 g. of crude ketone. This product in ethanol (30 ml.) was heated under reflux for 1 hour with Girard P reagent (2.0 g.) and acetic acid (3 ml.). The cooled reaction solution was poured into aqueous sodium bicarbonate solution and extracted with ether. The aqueous fraction was acidified to pH 1 with hydrochloric acid and extracted with ether. Evaporation of the extract and crystallisation of the residue from aqueous ethanol gave the 20-ketone (1.42 g.), M.P. 109°, $[\alpha]_D$ +45° (c., 0.9 in $CHCl_3$). Further recrystallisation from aqueous ethanol gave material with M.P. 111–112°, $[\alpha]_D$ +49° (c., 1.0 in $CHCl_3$).

EXAMPLE 9

3β-acetoxy - 20 - piperidinomethylene - 19 - norgregna-5:7:9(10)-triene (1 g.) in benzene (8 ml.) was added over a period of 1 hour to a stirred solution of sodium dichromate dihydrate (1.5 g.) and acetic acid (7.5 ml.) in benzene (5 ml.) at 0°. After the addition the mixture was stirred at 0° for a further hour and then two more hours at room temperature. After cooling, methanol (7 ml.) was added slowly, over a period of 10 minutes, and stirring was continued at 0° for a further 30 minutes. Water was added and the mixture was extracted with ether. The extract was washed with 2 N sodium carbonate solution, dried and evaporated in vacuo. The residue (0.791 g.) was treated with Girard P reagent as described in Example 8 to give the 20-ketone (0.5 g.).

Recrystallisation from aqueous alcohol afforded 3β-acetoxy-19-norpregna-5:7:9(10) - trien-20-one (0.4 g.), M.P. 112°, $[\alpha]_D$ +53.5° (c., 1.0 in $CHCl_3$).

EXAMPLE 10

Finely powdered chromic acid (4.45 g.) was added, over a period of 15 minutes, while stirring to pyridine (55 ml.) at 0° under nitrogen. A solution of 3β-acetoxy-20-piperidinomethylene-19-norpregna - 5:7:9(10) - triene (5.45 g.) in pyridine (55 ml.) was added over 5 minutes, the mixture was stirred for a further 4 hours at 0° and was then allowed to stand overnight at room temperature. Benzene was added and the mixture was filtered through kieselguhr and then through a column of alumina (60 g.) benzene being used for elution. Evaporation of the eluate in vacuo yielded 4.81 g. of material which was treated with Girard P reagent as in Example 8. Recrystallisation from aqueous ethanol furnished the ketone (3.24 g.), M.P. 112–113°, $[\alpha]_D$ +49.6° (c., 1.0 in $CHCl_3$). Further recrystallisation from ethanol gave 3β-acetoxy-19-norpregna-5:7:9(10)-trien-20-one with M.P. 113.5–114.5°, $[\alpha]_D$+52° (c., 1.0 in $CHCl_3$). (Found: C, 77.5; H, 8.2%. $C_{22}H_{28}O_3$ requires C, 77.6; H, 8.3%.)

EXAMPLE 11

*3β-hydroxy-19-norpregna-5:7:9(10)-trien-20-one*

3β-acetoxy - 19-norpregna-5:7:9(10)-trien-20-one (1 g.) potassium bicarbonate (0.5 g.), water (2.8 ml.) and methanol (10 ml.) were heated under reflux for 1 hour. The volume of solvent was reduced and the residue was extracted with ether. Evaporation of the extract and crystallisation of the residue from ether afforded 3β-hydroxy - 19-norpregna-5:7:9(10)-trien-20-one (0.51 g.), M.P. 146–147°, $[\alpha]_D$ +56° (c., 0.8 in $CHCl_3$). Further recrystallisation from ether gave material with M.P. 151–152°, $[\alpha]_D$ +58° (c., 0.9 in $CHCl_3$). (Found: C, 80.6, H, 8.85. $C_{20}H_{26}O_2$ requires C, 80.5, H, 8.8%.)

EXAMPLE 12

3β - hydroxy - 20-piperidinomethylene-19-norpregna-5:7:9(10)-triene prepared as in Example 7 (4.0 g.) was treated with chromic acid and pyridine as in Example 10. The Girard P separation afforded 1.87 g. of material which, on crystallisation from ether, furnished 3β-hydroxy - 19-norpregna-5:7:9(10)-trien-20-one (1.14 g.), M.P. 150° $[\alpha]_D$ +56.8° (c., 1.0 in $CHCl_3$).

EXAMPLE 13

*3β-acetoxy-20-piperidinomethylene-19-norpregna-5:7:9(10)-triene*

3β - acetoxy - 19-norpregna-5:7:9(10)-trien-20α-aldehyde (1.7 g.) was refluxed in benzene (30 ml., AnalaR)

containing piperidine (purified, 0.67 ml.) under nitrogen for 3.5 hours using a Dean and Stark apparatus for removing the water. The reaction mixture was then evaporated to dryness in vacuo and the resulting pale straw coloured partly crystalline residue (2.06 g.) was triturated with cold methanol and filtered off (1.63 g. 80%), M.P. 115–119°. Three crystallisations from acetone gave an analytical specimen of 3β-acetoxy-20-piperidinomethylene-19-norpregna-5:7:9(10)-triene, M.P. 126–128°, $[\alpha]_D$ —36° (c., 1.6 in $CHCl_3$). Found: C, 79.7; H, 9.3; N, 3.3. $C_{28}H_{39}O_2N$ requires C, 79.8; H, 9.25; N, 3.3%.)

We claim:

1. As new compounds, compounds of the general formula:

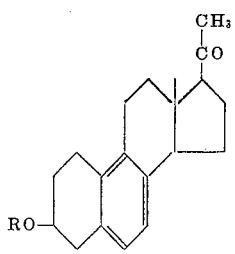

in which R is selected from the group consisting of hydrogen, an acyl radical derived from an aliphatic carboxylic acid containing from 1 to 6 carbon atoms and the benzoyl radical.

2. 3β-acetoxy-19-norpregna-5:7:9(10)-trien-20-one.
3. 3β-hydroxy-19-norpregna-5:7:9(10)-trien-20-one.
4. A process for the production of compounds of the general formula:

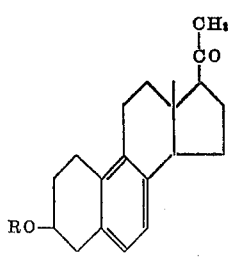

in which R is selected from the group consisting of hydrogen, an acyl radical derived from an aliphatic carboxylic acid containing from 1 to 6 carbon atoms and the benzoyl radical, which comprises the step of reacting with an oxidizing agent a compound of the general formula:

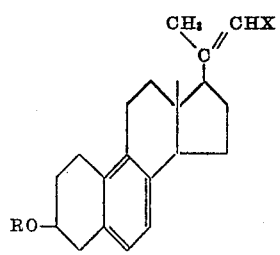

in which R has the same meaning as above and X is selected from the group consisting of the residue

in which $R_1$ is selected from the group consisting of aliphatic, aralkyl and aromatic groups, and $R_2$ is selected from the group consisting of aliphatic and aralkyl groups; the residue

where $R_3$ is a radical which together with the adjacent nitrogen atom forms the residue of a heterocyclic ring; and the residue —$OR_4$ in which $R_4$ is an acyl radical to convert the group >C=CHX to the group >CO.

5. A process as defined in claim 4 in which the oxidation is conducted using ozonized oxygen and the resulting ozonide is reduced.

6. A process as defined in claim 5 in which the oxidation is conducted in the presence of an organic solvent selected from the group consisting of ether and a mixture of chloroform and acetic acid.

7. A process as defined in claim 5 in which the oxidation is conducted at a temperature of from —40° C. to 0° C.

8. A process as defined in claim 5 in which the ozonide is reduced by catalytic hydrogenation.

9. A process as defined in claim 5 in which the ozonide is reduced with zinc and acetic acid.

10. A process as defined in claim 4 in which R is an acetyl radical and the group X is a piperidino group and in which the oxidation is conducted using a chromium trioxide-tertiary amine complex.

11. A process as defined in claim 10 in which the tertiary amine is pyridine.

12. A process as defined in claim 4 in which R is an acetyl radical and the group X is a piperidino group and in which the oxidation is conducted using an alkali metal dichromate in a liquid aliphatic carboxylic acid.

13. A process as defined in claim 4 in which the compound of the general formula:

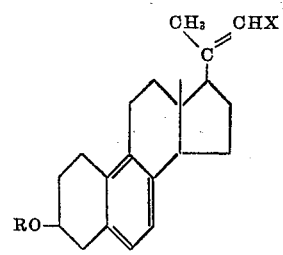

in which R has the meaning stated in claim 4 and X is selected from the group consisting of the residues

and

is prepared by reacting a compound of the general formula:

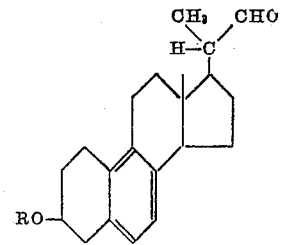

with a compound of the general formula selected from the group consisting of $R_1NHR_2$ and

14. A process as defined in claim 13 in which the reaction is conducted in the presence of a benzene as solvent medium.

15. A process as defined in claim 13 in which there is also present toluene-p-sulphonic acid as a strong acid catalyst.

16. A process as claimed in claim 13 in which the compound of general formula

is piperidine.

17. A process as defined in claim 4 in which the starting compound has the general formula:

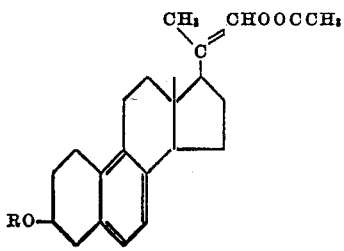

and is prepared by reacting a compound of the general formula:

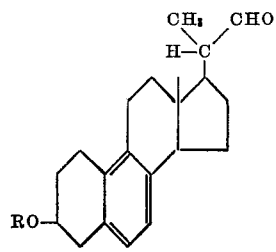

with acetic anhydride in the presence of an alkali metal acetate.

18. A process as claimed in claim 17 in which the enol-acylating agent is acetic anhydride in the presence of a sulphonic acid selected from the group consisting of sulphosalicylic acid, toluene sulphonic acid and methane sulphonic acid.

19. A process as defined in claim 4 in which R is a hydroxyl group and the group "X" is a piperidino group in which the oxidation is conducted using a chromium trioxide-tertiary amine.

References Cited in the file of this patent
UNITED STATES PATENTS
2,606,913    Levin _____ Aug. 12, 1952